United States Patent
Dempsey et al.

(10) Patent No.: US 6,356,917 B1
(45) Date of Patent: Mar. 12, 2002

(54) MONITORING AND RAISING ALERTS FOR DATABASE JOBS

(75) Inventors: Michael Dempsey, Sanford, FL (US); Annie Yu-Ju Yang, La Mirada, CA (US); Wai Hung Kam, West Hollywood, CA (US); Guy K. Ishimoto, San Diego, CA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/118,413

(22) Filed: Jul. 17, 1998

(51) Int. Cl.[7] ............................................... G06F 17/30
(52) U.S. Cl. ............................ 707/202; 707/1; 707/10; 707/104; 709/223
(58) Field of Search .............................. 707/3, 104, 10, 707/201–205; 711/13; 714/20, 22, 39; 710/16; 709/201, 220, 219, 224, 223, 205; 600/509; 340/539, 825.44, 870.01; 379/29, 45; 342/357.02, 465; 455/404; 370/216; 702/187

(56) References Cited

U.S. PATENT DOCUMENTS

| | | | | |
|---|---|---|---|---|
| 5,404,488 A | * | 4/1995 | Kerrigan et al. | 714/22 |
| 5,579,001 A | * | 11/1996 | Dempsey et al. | 340/870.01 |
| 5,673,304 A | * | 9/1997 | Conner et al. | 379/45 |
| 5,684,945 A | * | 11/1997 | Chen et al. | 714/20 |
| 5,758,071 A | * | 5/1998 | Burgess et al. | 709/220 |
| 5,822,398 A | * | 10/1998 | Hall et al. | 379/29 |
| 5,835,702 A | * | 11/1998 | Levine et al. | 714/39 |
| 5,838,252 A | * | 11/1998 | Kikinis | 340/825.44 |
| 5,905,868 A | * | 5/1999 | Baghai et al. | 709/224 |
| 5,911,048 A | * | 6/1999 | Graf | 709/224 |
| 6,021,433 A | * | 2/2000 | Payne et al. | 340/825.44 |
| 6,122,664 A | * | 9/2000 | Boukobza et al. | 709/224 |
| 6,125,390 A | * | 9/2000 | Touboul | 709/223 |
| 6,158,025 A | * | 12/2000 | Brisse et al. | 714/48 |

OTHER PUBLICATIONS (IEEE publication Jun. 2000) Dong et al. "DWINS: a dynamically configurable Web–based information system" paper in Advanced Issues of E–Commerce and Web–based Information Systems, 2000, pp. 85–92.*

Handling unanticipated events in a single and multiple auv systems by Roy Turner et al, University of New Hampshire, Durham, NH, pp. II/125–II/130, Sep. 1994.*

* cited by examiner

*Primary Examiner*—Diane D. Mizrahi
(74) *Attorney, Agent, or Firm*—Gates & Cooper

(57) ABSTRACT

A method, apparatus, article of manufacture, and a memory structure for monitoring and raising alerts in data processing jobs. The alert and monitoring system uses a monitor request table stored in a relational database as a central repository in which data process jobs insert monitoring requests. The monitoring requests specify the time at which alerts or monitoring notices should be taken, and if the data processing job fails to submit an updated monitor request, the action described in the monitor request is taken. Provision is made for customized actions to be taken via a action alert table, which stores additional data allowing conditional and logical invocation of actions.

25 Claims, 5 Drawing Sheets

MONITORING AND RAISING ALERTS FOR DATABASE JOBS

BACKGROUND OF THE INVENTION

1. Field of the Invention

The present invention relates to systems and methods for data processing, and in particular to a system and method for monitoring data processing jobs and for reporting job progress to interested parties.

2. Description of the Related Art

Large-scale integrated database management systems provide an efficient, consistent, and secure means for storing and retrieving vast amounts of data. This ability to manage massive amounts of information has become a virtual necessity in business today.

Typically, queries directed to these databases are submitted as database jobs submitted by a company's management information systems (MIS) department. In many cases, these jobs are sufficiently large and complex so that even under ideal circumstances, the job will not be completed for a substantial period of time. In many cases, to preserve computer resources, these jobs are typically submitted when other data processing requirements are low, i.e. evenings and weekends.

Database jobs often stop due to blocks. Blocks are a resource contention problem that occurs when a job blocks other jobs from execution until its processing is completed. The processing of database jobs may also be substantially slowed because of inefficient query design or unexpected delays in accessing data necessary to perform the search. Unfortunately, the user is given no indication that the processing has stopped, or is taking longer than expected. The result is that the database job can remain in the state for an extended period of time. Eventually, a job operator may notice that the database job has been running for too long, and embark on an investigation into the matter. However, by the time the operator takes action, the batch schedule for other database jobs can be severely impacted. Further, if the individual submitting the database job was informed of the problem in a more timely manner, changes to the database request could have been made which would have expedited processing and avoided a needless waste of time and data processing resources.

What is needed is a system which informs the database management system operator and/or the person submitting the job to be informed of the jobs progress. This allows the problem to be timely corrected and the impact upon the batch schedule to be reduced. The present invention satisfies that need with a system and method for allowing the database job itself to inform the operator, other person, or the submitting application to be timely informed of the database job's progress.

SUMMARY OF THE INVENTION

To address the requirements described above, the present invention discloses a method, apparatus, and article of manufacture for monitoring and raising alerts for database jobs.

The method begins by generating and submitting a monitoring request associated with the data process. The monitoring request comprises an action time and action information comprising an action code and an action destination. The monitoring request is accepted and stored in a monitor request data structure. In one embodiment, the monitoring request is stored as a row in a table in a relational database management system. The monitoring request is repeatedly processed over a selectable interval to determine if the action time is earlier than the current time. When the action is earlier than the current time and the submitting data process has not completed, a function in a DLL is called which reads information describing the action to be taken. Based upon the information so read, a function for performing that action is called. Candidate actions include sending a page to a specific number, sending an e-mail message to the operator or the job submitter, raising a simple network management protocol (SNMP) trap that can be used by a centralized SNMP system, running a user-provided or specified application, or any definable action. The submitting data process repeatedly inserts new monitoring requests at selected intervals, and if no updated monitoring request is received by an expected time provided in the previous monitoring request, an appropriate action is initiated. This design allows the submitting data process additional control over the notification process, and simplifies the design of the software modules implementing the alert-raising functions by relieving them of the responsibility of keeping track of multiple database jobs. In another embodiment, the present invention comprises a program storage device tangibly embodying a series of instructions for performing the method steps described above.

In another embodiment, the present invention is described by an apparatus for monitoring a data process. The apparatus comprises a means for accepting a monitoring request with an action data and an action code for the data process, a memory for storing and retrieving the monitoring request in a row of a table stored in a relational database management system. An alert control module is provided, which periodically processes the monitor request table to determine if an action as characterized by the action code should be taken. Typical action codes are the character "P" for paging, and a character "E" for an e-mail. The invention also comprises an alert action module which commands the action specified by the action code when indicated by the alert control module. Detailed specifics regarding the action, such as what the action is, who messages are to be sent to, and the data required for performing these actions are stored as a row in an alert action table in the relational database.

The foregoing allows the submitting user or application, or the database management system operator to be informed of the progress of database jobs. If problems arise, the database jobs can be taken offline or altered as required.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
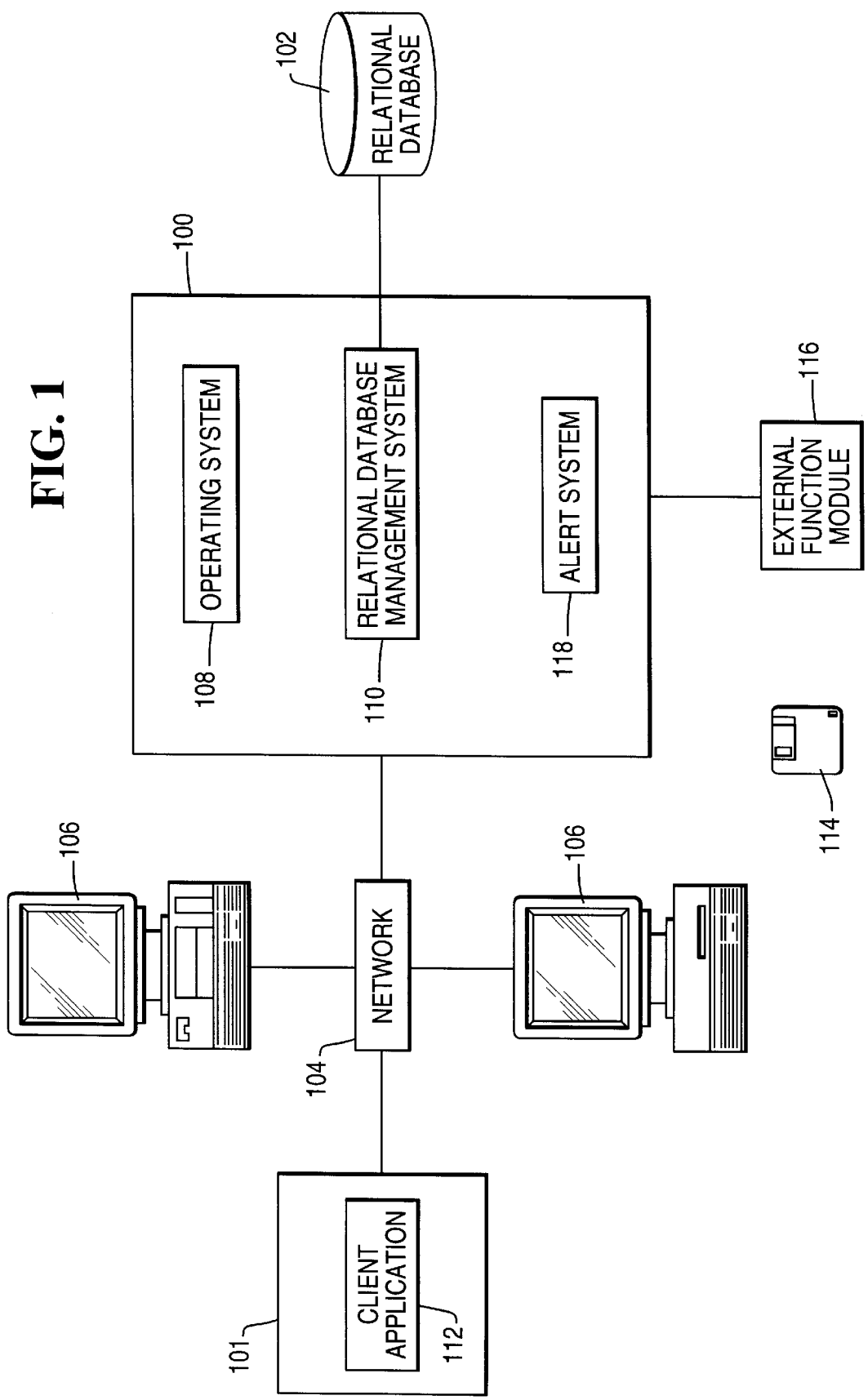
FIG. 1 is a block diagram depicting a relational database management system implementing one embodiment of the present invention.

FIG. 1 illustrates an exemplary hardware environment of the data processing system of the present invention. In the exemplary environment, the data processing system is typically comprised of one or more processors coupled to one or more fixed and/or removable electronic data storage units (DSUs) 102, such as disk drives, that store one or more relational databases, along with other data and programs. A computer system 100 may be connected to via a network 104 one or more client systems 106, such as workstations or personal computer, that are used by application programmers, database administrators, end users etc.

The computer system 100 operates under the control of an operating system 108 and executes a relational database management system (RDBMS) 110 that acts as an interface between the client systems 106 and a relational database stored on the DSUs 102. The present invention is typically embodied in one or more components of the RDBMS 110.

The RDBMS 110 is tangibly embodied in a computer-readable device, carrier, or medium, such as fixed or removable DSUs 102, a remote system coupled to the computer system 100 via a data communications device, or portable storage medium 114 such as a floppy disk, CD-ROM, or other media. Moreover, the RDBMS 110 is comprised of instructions which, when executed by the computer system 100, cause the computer system 100 to perform the steps necessary to implement the steps and elements of the present invention described below.

Operators of the client systems 106 interact with a client application 112 that causes the client systems 106 to transmit electrical signals to and from the computer system 100 that represent commands for performing various search and retrieval functions, termed queries, and various data update functions. The RDBMS 110 then performs the desired data access using the relational database, and data retrieved from the relational database is returned to the client systems 106 in response to the queries.

In the preferred embodiment of the present invention, the queries conform to the Structured Query Language (SQL) standard and the RDBMS 110 comprises the TERADATA® product offered by NCR Corporation, the assignee of the present invention. Those skilled in the art will recognize, however, that the present invention has application to any RDBMS 110, and indeed, any other data process. The RDBMS 110 performs the functions necessary to implement the RDBMS functions and SQL standards, i.e., definition, compilation, interpretation, optimization, database access control, database retrieval, and database update.

The alert system 118 can be implemented in computer 100, but alert system functionality can be implemented in other client systems 106, or elsewhere in the network as a separate process. External function module 116 represents additional components or functionality to take the actions specified by the alert system 118. For example, if the required action is paging the submitting user, the external function module 116 accepts the paging command, and either provides the interface with a paging network, or broadcasts the paging message as required.

Overview

Figure 2:
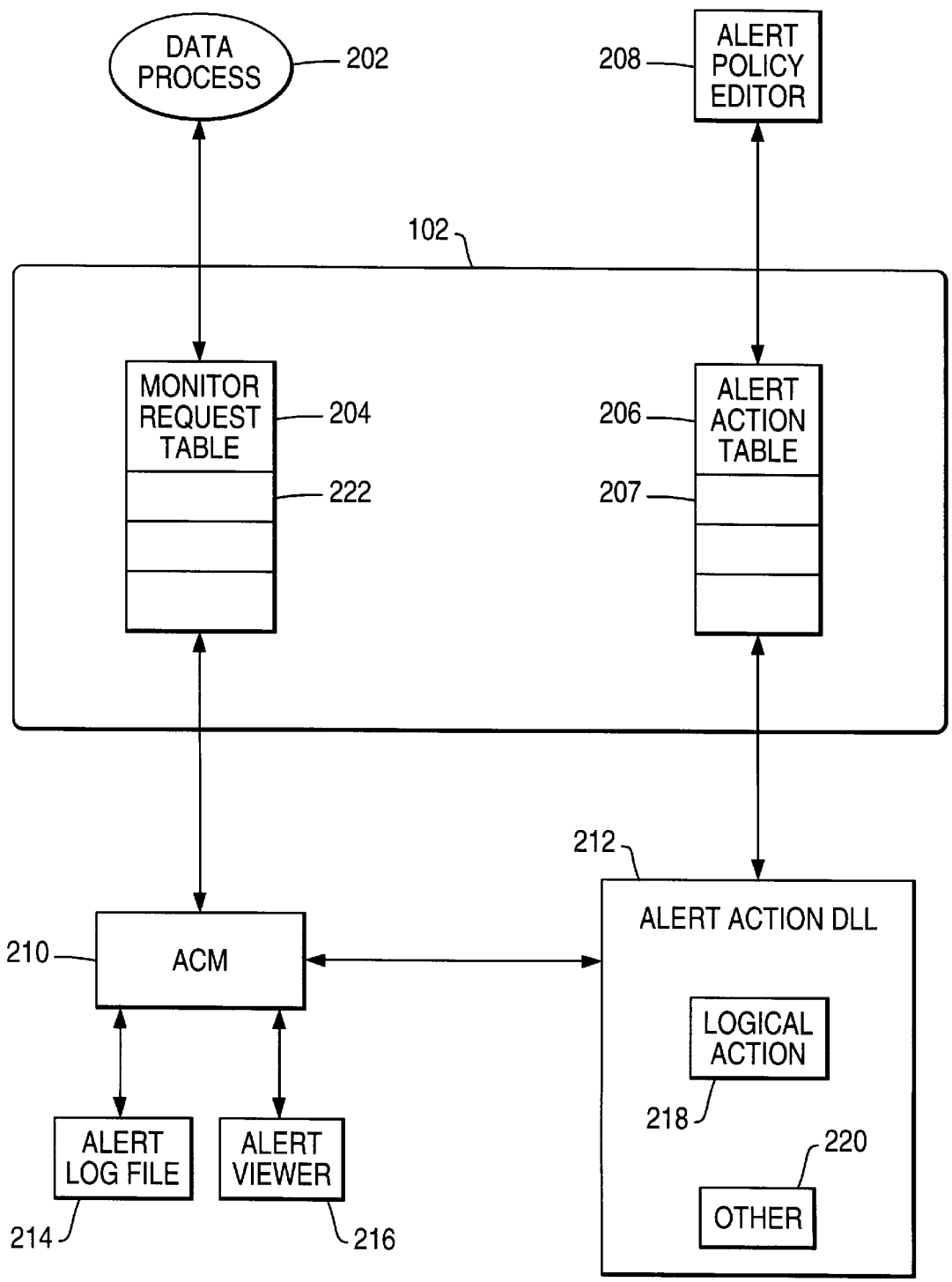
FIG. 2 is a block diagram showing the modules implementing the present invention

FIG. 2 is a block diagram illustrating one embodiment of the present invention. The alert system comprises a monitor request table 204 and an alert action table 206 which are stored in the DSUs 102 of the RDBMS 110. The monitor request table accepts monitor requests from the data process 202 as a row 222.

The alert system also comprises an alert control module 210 and an alert action dynamic link library (DLL) 212. The alert control module 210 processes the monitor request table 204 to determine when actions should be taken, and when necessary, invokes a logical action function 218 in the alert action dynamic link library (DLL) 212 to perform that function. If necessary, other functions 220 are invoked as well. Also included are an alert log file 214 and an alert viewer 216. The alert policy editor 208 performs operations on an alert action table 206 and an alert control table via the relational database management system 110. By storing the foregoing information in the alert action table 206, and the alert control table, RDBMS 110 technology is leveraged to provide a centralized repository for alert data, referential integrity and fallback protection.

The monitor request table 204 provides a central location for database jobs to insert monitoring requests, with each monitoring request represented by one row 222. The ACM 210 periodically processes monitoring requests from the monitor request table 204, and takes the required action. As described below, the action may be specified within the monitor request table 204 itself, or may refer to the alert action table 206 as required. The alert action (DLL) 212 provides a set of application program interface (API) functions that can be called by the ACM 210 to take the necessary actions. The alert action table 206 provides a central location for action definitions, with each defined action comprising one row 207 within the alert action table 206. The alert policy editor 208 provides a graphical user interface which allows the user to modify the alert action definitions and to set the interval at which monitor requests are processed.

A detailed description of the operation of the foregoing elements is presented below.

Monitor Request Table

To enable the monitoring and reporting function, each monitored data process periodically inserts a monitor request as a row 222 in the monitor request table 204. Each request specifies a job identification, an action time, and action information. The action time specifies the time before which the next monitor request should be received from the data process. The action time may also include action date information, either combined with the time field, or in a separate field. In either case, if an updated monitoring request is not received before the action time, the ACM 210 initiates the action that was requested in the previous monitoring request according to the action information. Requests can be inserted using a standard SQL INSERT statement or by similar means.

After a data process is completed, it inserts a monitoring request with a zero indicating "end of monitoring" indication in the action code. The ACM 210 will use this code to clean up any outstanding requests from the data process by deleting monitoring requests that are no longer needed.

To generate alerts when data processes fail to send an updated monitoring request, the ACM 210 reads the monitor request table to obtain the data shown in Table 1. Each of the entries in Table 1 is normally represented as a column entry for the applicable row in the monitor request table 204.

TABLE 1

| | |
|---|---|
| Monitor ID | A unique identification for the Utility job. In one embodiment, this identification comprises a connect date, time, host ID and session # |
| Action Date | Date before which next Monitor request should be received. |
| Action Time | Time before which next Monitor request should be received. |
| Action Code | Type of alert action being requested. For example, an action code of "P" may be used to indicate that the individual is to be paged, and an action code of "G" may be used to indicate that a group of actions will be taken. If "end of monitoring" is desired, the action code is set to zero. If an alert action defined in the alert action table 206 is desired, this field is left blank. |
| Job Name | Name of requesting utility job (e.g. 'Multiload Job ABC') |
| Description | A user-definable variable that allows for customized monitoring. For example, a user may ask to see the number of rows processed at a particular point in time. In this case, the variable may be "row-count" |
| Value | The value of the user-defined variable |
| Destination number | Address to which alert will be sent (e-mail address, phone number, etc.) |
| Message | Optional message to be sent for this alert. |

Alert Action Table

The alert action table 206 is created in the relational database 102, and contains one row for each action defined. The alert policy editor 208 provides the user with an interface to define the action that should be taken (when the action code is blank) and to insert data into the alert action table 206. The alert policy editor 208 provides a default set of actions that may be used initially, allowing new definitions to be set, saved, and reloaded at another time. Data in the alert action table 206 is summarized in Table 2 below.

TABLE 2

| | |
|---|---|
| Action | The logical action used in the monitor request table |
| Action Code | A simple identification to indicate the physical action (i.e. "P" may designate a page) |
| Repeat Period | Do not repeat the alert action within this period. A zero entry means alert is always enabled |
| Description | Alert description string (e.g. Number of Rows Processed) |
| Value | Value of alert description string |
| Destination | Destination for the alert action, such as the IP address if sending an e-mail, or page number if sending a page. |
| Message | An optional column, depending on the action that will be taken |

Alert Policy Editor

The alert policy editor 208 provides a graphical user interface (GUI) which allows the user to define the action(s) that should be taken, and to modify the alert action definitions by entering changes into the alert action table 206. The alert policy editor also allows the user to set the interval at which the monitor requests are processed by making suitable changes to the control table described below. The alert policy editor can run on any computer that has connectivity to the RDBMS 110.

The version number of the alert action table and the monitor frequency used by the ACM 210 are each stored a row of a centralized control table stored in the DSU 102. This can be used to notify the ACM 210 that the data stored in the table has changed.

Alert Control Module

The ACM 210 processes monitor requests read from the monitor request table 204, and does so at an interval that is specified through the alert policy editor 208 and stored in the control table. This is accomplished by reading the monitor request table 204 to find the row 222 with the highest action date and time for each job. If the action date has already passed and the action code is not set to zero to indicate "end of monitoring," a logical action function 218, which is one of the functions in the alert action DLL 212, is called.

In many cases, the action code, destination and message portions of the monitor request table 204 provides all the information that is required for the logical action function 218 to take the necessary action. For example, inserting the character "P" in the action code can indicate that the required action is to page a person. The destination field provides the page number, including all characters necessary to complete the page, and the message field provides any paging message.

In some cases, it is desirable to implement more detailed actions than that which is possible with a simple action code. In such situations, a blank is inserted for the action code, and the alert action table (which is defined via the alert policy editor) is accessed to determine which action(s) need to be taken. This feature allows the action taken and the rates at which the actions occur to be actively controlled. For example a user may want to institute an action policy whereby all technical support personnel are paged, but not if the same individuals were paged within the last thirty minutes. The action definitions defined in the alert action table 206 permit such action definitions to be implemented. Reference to the alert action table 206 is invoked when the action code in the monitor request table is blank. When the alert action table 206 is invoked, the logical action function 218 reads the action definition, including the description and value fields, from the alert action table 206. From these definitions, the logical action function 218 determines if action should be taken (for example, the action definition precludes paging a person more often than once every thirty minutes, action is not taken if the last page occurred less than thirty minutes ago). The logical action function then merges the description and value data with data from the appropriate portion of the monitor request, and uses the action code to initiate the required action by calling the appropriate alert action DLL function 220. The required action may be a list of actions to be taken. For example, the required action may call for sending e-mails as well as pages should be sent to the addresses indicated.

Alert Action DLL

The alert action DLL 212 is a library of functions, including a logical action function 218 which reads the action definition from the alert action table 206 and determines whether action should be taken. If action should be taken, the logical action function 218 calls any combination of the other alert functions 220, including (1) a DLL function which sends a numeric page to a specified number (2) a DLL that sends an e-mail message to the intended recipient, (3) a DLL that raises an SNMP trap that can be picked up by the network's 104 SNMP system, (4) running a specified user provided application (as enabled by the user's network and software tools), (5) writing the alert information to a log.

In each case, the information required to perform the requested function, such as the destination and the message, is passed to the functions as parameters. The functions (typically implemented in the external function module 116)

are then responsible for taking the appropriate action. The alert action DLL 212 also contains an alert action request function, which translates user defined functions into actual physical actions to be performed, and also determines whether a physical action should occur. For example, if the alert action table 206 specifies that support technicians should be paged, but do not page again if paged within the last thirty minutes, then this function checks its record of past actions and determines whether a page should be issued.

Alert Viewer

The alert viewer 216 interfaces with the ACM 210, and allows the user to look at the current state of the alert system 118.

Alert Log File

All actions taken by the alert system 118 are recorded in an alert log file 214. The alert log file is usually stored on the system on which the ACM 210 is running. The alert log file 214 is typically a tab-delimited file that may be read into a spreadsheet or a database program for further analysis. A new alert log file 214 will be created when the file exceeds a maximum size or when the file is first defined. The alert log file 214 filename is generated by the ACM 210, and includes the machine name, date, and time for easy log identification. Each alert log entry in the alert log file 214 contains the information shown in Table 3.

TABLE 3

| | |
|---|---|
| Date | Monitor request date |
| Time | Monitor request time |
| Job Name | Name of the requesting job or data process 202 |
| Parameter | Alert description string (e.g. "multiload job at 'A'") |
| Value | Value of event being alerted on |
| Action Code | Type of alert action requested |
| Message | Optional message to be sent for this alert |
| Result Flag | A flag indicating the result: (1)successful, (2) unable to complete action, or (3) no action taken due to repeat limit |

Process

Figure 3A:
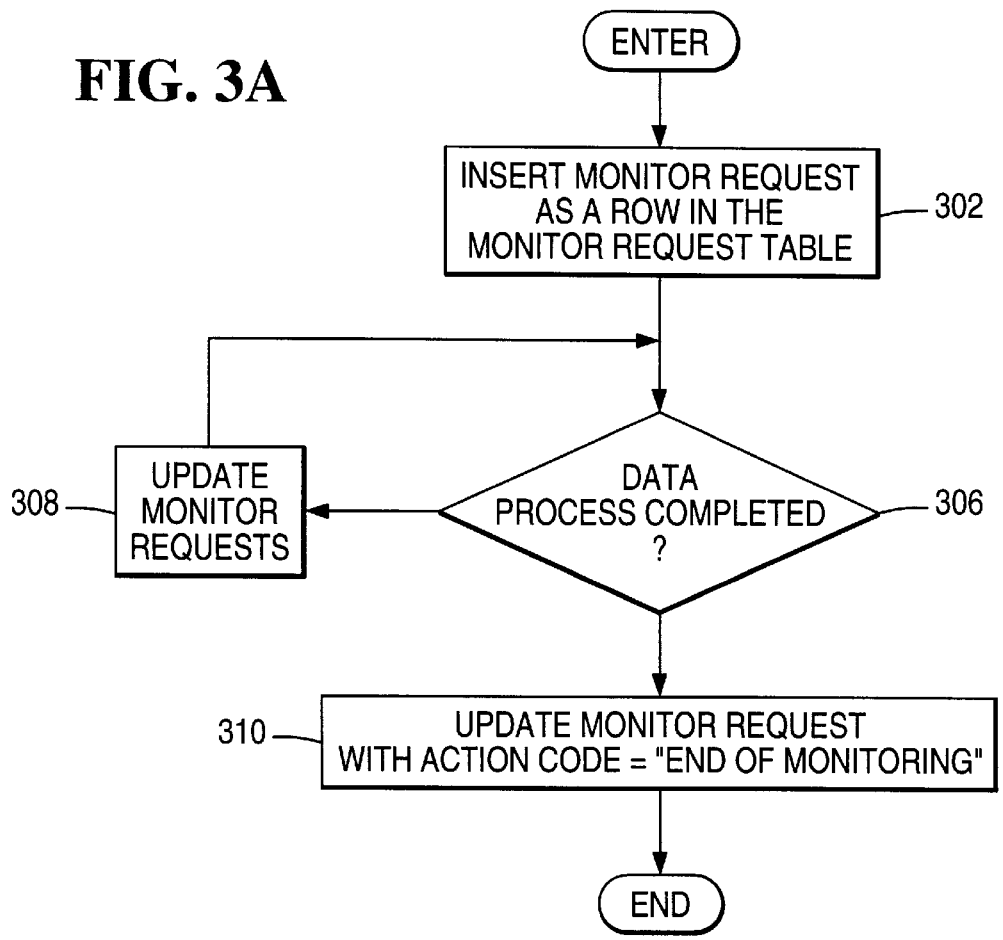
FIG. 3A is a flow chart showing the operations performed by the process to provide the alert and monitoring functions of the present invention.

FIG. 3A is a flow chart showing the operations used by the process to provide the alert and monitoring functions of the present invention. As described earlier in this disclosure, data processes 202 wishing to be monitored indicate as such by inserting a monitor request as a row 222 of the monitor request table 204. This is depicted in block 302. If the data process 202 has completed and is inactive, no further monitoring is desired, and a monitoring request is updated by writing a new row in the monitor request table 204 with an action code of zero indicating "end of monitoring." This is depicted in block 310. If the data process 202 is not completed, and monitoring is desired, an updated monitoring request with the desired parameters is provided by inserting a row with the pertinent information in the monitor request table. This is depicted in block 308.

The data process periodically provides an updated monitor request 306 (by inserting a new row 222 in the monitor request table 204), and each monitoring request includes an action time (and date) which defines a time by which the next monitor request should be received. If a monitoring request is not received from the data process by the time indicated by the action time and action date, the action defined in the monitor request or the alert action table 206 is taken. By "updating" the monitoring request by simply inserting a new row in the monitor request table 204 (instead of altering the existing row), the present invention effectively shifts much of the burden of updating the monitor request from the process to the alert control module 210. If the process were required to alter the monitor request table 204 row 222, it would have to keep track of the location and content of the monitor request row. By allowing the update to be performed merely by inserting a new row, the process is relieved of these requirements, and it is left to the ACM 210 to use the most recent row in the monitor request table 204.

This implementation allows the user to use some unique strategies. For example, the data process 202 can deliberately insert updated monitoring requests shortly after the action time specified for the previous case. In this case, the user will receive periodic messages, which could comprise the progress of the data process 202 job. This can be implemented, for example, by inserting a blank for the action code of the monitor request so that the alert action table 206 is consulted for the alert information, and by inserting suitable information for the description and value information from the alert action table. For example, if the user wishes to receive periodic updates as to the progress of a database job, an action time can be specified which is less than the period for which the data process 202 will update the monitor request (this assures that an alert action will be taken), and the description in the alert action table 206 can be set to "rows processed." The foregoing technique places additional impetus on the data process 202 to continually provide monitor requests, but removes much of the processing and bookeeping burden from the RDBMS 110, and allows the data process to directly control the monitoring process without complicated or unnecessary interfaces with the RDBMS 110. All that is required is that the data process 202 insert a monitoring request as a row in the monitor request table 204 at suitable intervals.

Figure 3B:
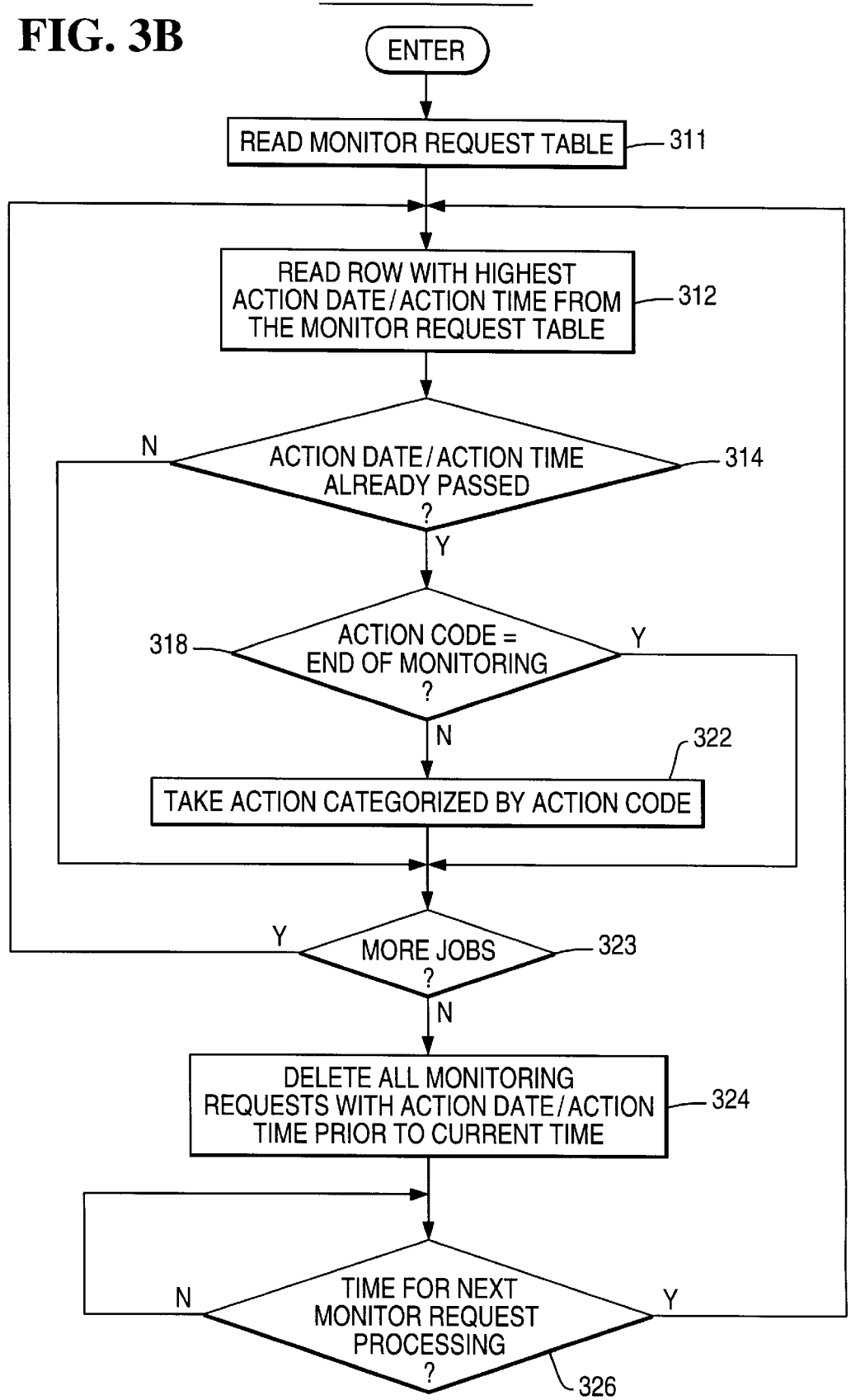
FIG. 3B is a flow chart showing the operations performed by the ACM to provide the alert and monitoring functions of the present invention.

FIG. 3B is a flow chart illustrating the operations performed by the ACM in providing the alert and monitoring functions of the present invention. At an interval specified in the control table, the ACM 210 issues a command to the RDBMS 110 to read the monitor request table 204 to find the row corresponding to the highest action date and action time for a particular job. This is depicted in blocks 311 and 312. These monitor requests are then checked to determine if the action date and action time has already passed in block 314. For those which have not passed, no further processing is required until the next monitor request processing interval. For those monitor requests for which the action date/action time has passed further processing is required.

First, if the action code in the monitoring request is zero (indicating the requesting process has completed), no further processing is required, as shown in block 318. A monitoring request with a zero action code will be deleted later in the logic, along with the other monitoring requests for which the current time has passed the action date and time of the monitoring request. If the action date/action time for the monitoring request has passed, and the action code is non-zero, the action categorized by the action code is taken, as shown in block 322. Further details regarding this logic is presented below. After the appropriate action is taken, the foregoing steps are repeated for each job, as shown in block 323. Alternatively, the foregoing could be implemented by issuing a single SQL statement to the RDBMS 110 requesting the most recent rows in the monitor request table 204 for all jobs.

After all jobs have been examined and all action(s) required by those jobs have been taken, all monitoring requests with action dates and action times prior to the current time are deleted, and processing waits until the next interval for monitor request processing arrives. This is depicted in blocks 324 and 326.

Figure 4:
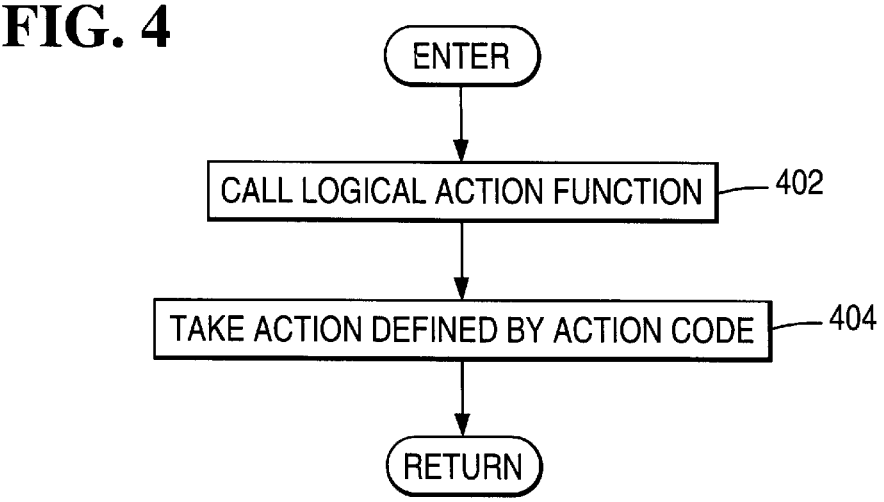
FIG. 4 is a flow chart showing the operations used to take the alert actions in the present invention.

FIG. 4 is a block diagram showing the logic performed in taking the action categorized by the action code. Using the information in the message request, one of the alert action DLLs, the logical action function 218 is called. That function then proceeds to take the action characterized by the action code.

Figure 5:
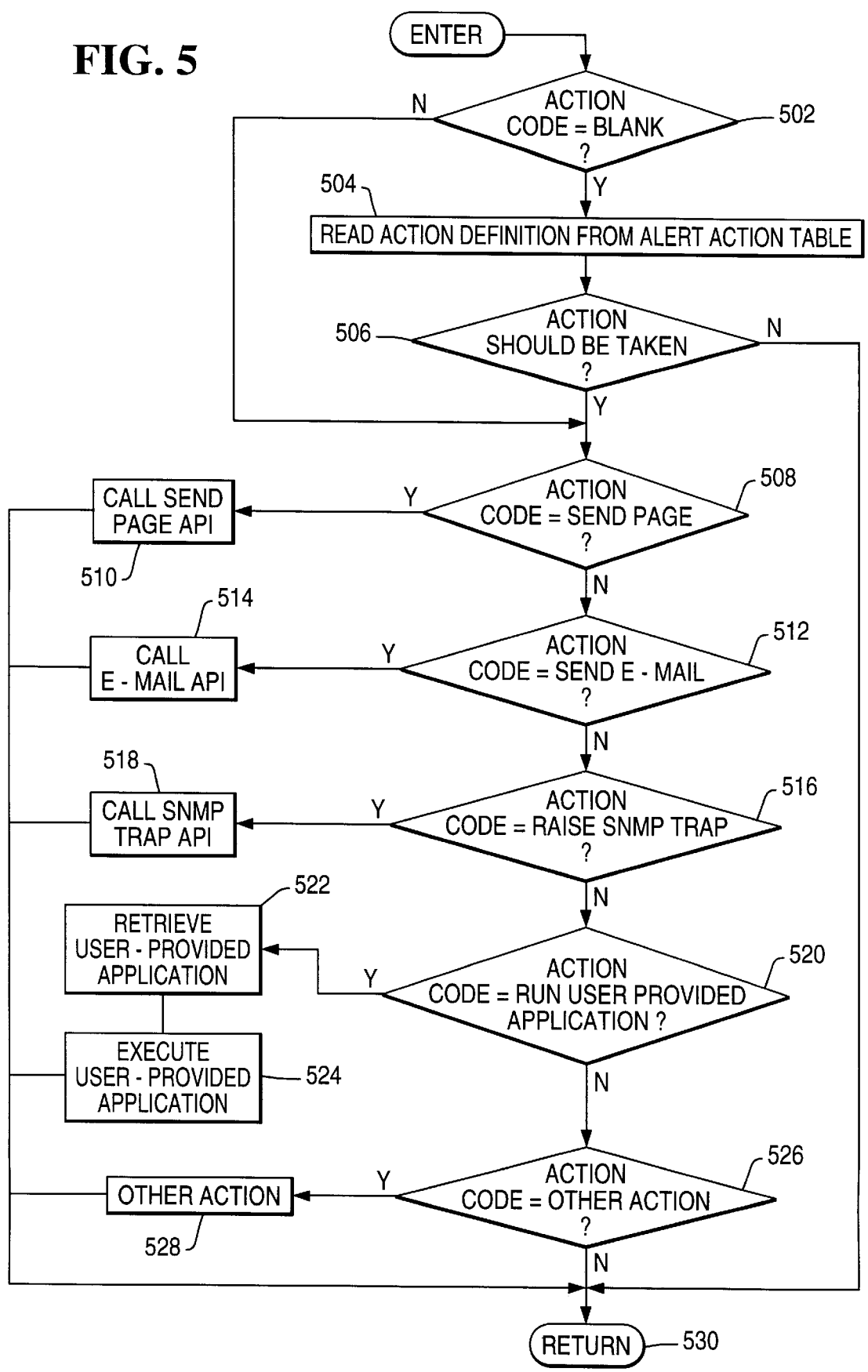
FIG. 5 is a flow chart showing further details of the operations used to take the alert actions.

FIG. 5 is a block diagram showing the logic performed by the logical action function in taking the action characterized by the action code. First, the action code is examined to determine if it is blank. This is depicted in block 502. If the action code is not blank, the logic of blocks 504 and 506 is bypassed, and the action characterized by the action code and specified by the destination number and message is taken, as depicted in blocks 508–530. If the action code is blank, the desired action must be obtained from the definition stored in the action alert table 206. The logical action function 218 reads the definition and determines whether action should be taken. This is depicted in blocks 504 and 506. Factors which could result in an action not being taken include cases where the same or similar action has already occurred. For example, if a person was paged with the status of the data process 202 only recently, and the status has not changed, the logic in block 506, based upon the action definition stored in the action alert table 206 would prevent another page from being sent. Other logical conditions may also call for the alert system 118 to refrain from taking the specified action as well. If it is determined that action should be taken, the description and value fields from the alert action table are merged with data from the applicable row of the monitor request table, and an appropriate action is taken.

If the action code is non blank and non zero, the action specified by the action code, the destination number, and the message is taken. The action associated with sending a page is depicted in blocks 508 and 510. The action associated with transmitting an e-mail is depicted in blocks 512 and 514, and the actions associated with calling an SNMP trap are illustrated in blocks 516 and 518.

The present invention also allows an appropriate action code to invoke the execution of a user-provided or user-defined application. Blocks 520–524 illustrate this functionality. Finally, other actions may also be implemented, as depicted in 526 and 528. It should be noted that although the actions shown in FIG. 5 are depicted as if they are mutually exclusive (that is, the selection of one precludes selection of another action as well), this need not be the case. Multiple actions may be implemented by selecting an action code which specifies a listed group of actions.

Conclusion

This concludes the description of the preferred embodiments of the present invention. In summary, the present invention describes a method, apparatus, and article of manufacture for monitoring and raising alerts for database jobs.

The method comprises the steps of generating and submitting a monitoring request associated with the data process. The monitoring request comprises an action time and action information. The monitoring request is inserted into a monitor request data structure. In one embodiment, the monitoring request is stored as a row in a table in a relational database management system. The monitoring request is repeatedly processed over a selectable interval to determine if the action time is earlier than the current time. When the action time is earlier than the current time and the submitting data process has not completed, a function in a DLL is called which reads information describing the action to be taken. Based upon the information so read, a function for performing that action is called. Candidate actions include sending a page to a specific number, sending an e-mail message to the operator or the job submitter, raising a simple network management protocol (SNMP) trap that can be used by a centralized SNMP system, running a user-provided or specified application, or any definable action. The submitting data process repeatedly inserts new monitoring requests at selected intervals, and if no updated monitoring request (represented by a new row in the monitor request table) is received by an expected time provided in the previous monitoring request, an appropriate action is initiated. This design allows the submitting data process additional control over the notification process, and simplifies the design of the software modules implementing the alert-raising functions by relieving them of the responsibility of keeping track of multiple database jobs.

In another embodiment, the present invention comprises a program storage device tangibly embodying a series of instructions for performing the method steps described above.

In yet another embodiment, the present invention is described by an apparatus for monitoring a data process. The apparatus comprises a means for accepting a monitoring request with an action data and an action code for the data process, a memory for storing and retrieving the monitoring request in a row of a table stored in a relational database management system. An alert control module is provided, which periodically processes the monitor request table to determine if an action as characterized by the action code should be taken. Typical action codes are the character "P" for paging, and a character "E" for an e-mail, or "G" for a group of actions, possibly comprising both e-mail and paging. The invention also comprises an alert action module which commands the action specified by the action code when indicated by the alert control module. Detailed specifics regarding the action, such as what the action is, who messages are to be sent to, and the data required for performing these actions are stored as a row in an alert action table in the relational database.

The foregoing allows the submitting user or application, or the database management system operator to be informed of the progress of database jobs. If problems arise, the database jobs can be taken offline or altered as required.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An apparatus for monitoring a data process in a relational database management system, comprising:

means for accepting a monitoring request for the data process, the monitoring request comprising an action time and an action information including an action code and an action destination;

memory for storing and retrieving the monitoring request in a row of a monitor request table stored in the relational database management system;

an alert control module for periodically processing the monitor request table to determine if an action characterized by the action code should be taken; and means for comparing a current time to the action time;

means for initiating the action when the action time is earlier than the current time;

means for deleting monitoring requests for actions that have been taken; and an alert action module for commanding the action specified by the action code when indicated by the alert control module.

2. The apparatus of claim 1 wherein the alert control module comprises:

means for comparing a current time to the action time; and means for initiating the action characterized by the action code when the current time is later than the action time.

3. The apparatus of claim 1, further comprising means for deleting monitoring requests for actions which have been taken.

4. The apparatus of claim 1, further comprising an alert action dynamic link library for reading an action definition from an alert action table stored in the relational database and for sending a command the perform the action.

5. The apparatus of claim 1 further comprising means for periodically accepting updated monitoring requests from the data process.

6. A method of monitoring a data process, comprising the steps of:

(a) accepting a monitoring request associated with the data process in a monitor request table data structure, the monitoring request having an action time and an action code;

(b) recurrently processing the monitoring request data structure to determine if the action time is earlier than the current time;

(c) taking an action characterized by the action code when the action time is earlier than the current time and the data process has not completed; and (d) deleting the monitoring request from the monitor request data structure after the action has been taken; and wherein the step of accepting a monitoring request in a monitor request data structure comprises the step of inserting the monitoring request as a row in a monitor request table.

7. The method of claim 6, wherein the data process job comprises a relational database management system query, and the monitor request table is stored in the relational database management system.

8. The method of claim 6, further comprising the step of repeating steps (a) through (f) until the data process has completed.

9. A method of monitoring a data process, comprising the steps of:

(a) accepting a monitoring request associated with the data process in a monitor request table data structure, the monitoring request having an action time and an action code;

(b) recurrently processing the monitoring request data structure to determine if the action time is earlier than the current time;

(c) taking an action characterized by the action code when the action time is earlier than the current time and the data process has not completed; and (d) deleting the monitoring request from the monitor request data structure after the action has been taken; and wherein the monitoring request is accepted from the data process.

10. A method of monitoring a data process, comprising the steps of:

(a) accepting a monitoring request associated with the data process in a monitor request table data structure, the monitoring request having an action time and an action code;

(b) recurrently processing the monitoring request data structure to determine if the action time is earlier than the current time;

(c) taking an action characterized by the action code when the action time is earlier than the current time and the data process has not completed;

(d) deleting the monitoring request from the monitor request data structure after the action has been taken;

(e) updating the monitoring request; and (f) repeatedly performing steps (b) through (d) using the updated monitoring request.

11. A method of monitoring a data process, comprising the steps of:

(a) accepting a monitoring request associated with the data process in a monitor request table data structure, the monitoring request having an action time and an action code;

(b) recurrently processing the monitoring request data structure to determine if the action time is earlier than the current time;

(c) taking an action characterized by the action code when the action time is earlier than the current time and the data process has not completed; and (d) deleting the monitoring request from the monitor request data structure after the action has been taken; and wherein the step of taking an action characterized by the action code comprises the steps of:

reading an action definition from an action alert data structure; and taking the action specified by the action definition.

12. A method of monitoring a data process, comprising the steps of:

(a) accepting a monitoring request associated with the data process in a monitor request table data structure, the monitoring request having an action time and an action code;

(b) recurrently processing the monitoring request data structure to determine if the action time is earlier than the current time;

(c) taking an action characterized by the action code when the action time is earlier than the current time and the data process has not completed; and (d) deleting the monitoring request from the monitor request data structure after the action has been taken; and wherein the step of taking the action characterized by the action code comprises the step of transmitting a message to an interested party.

13. An apparatus for monitoring a data process, comprising:

means for accepting a monitoring request associated with the data process in a monitor request data structure, the monitoring request having an action time and an action code;

means for recurrently processing the monitoring request data structure to determine if the action time is earlier than the current time;

means for taking an action associated with the action code when the action time is earlier than the current time and the data process has not completed; and deleting the monitoring request from the monitor request data structure after the action has been taken.

14. The apparatus of claim 13, wherein the means for accepting a monitoring request in a monitor request data structure comprises means for inserting the monitoring request as a row in a monitor request table.

15. The apparatus of claim 14, wherein the data process comprises a relational database management system query and the monitor request table is stored in the relational database management system.

16. The apparatus of claim 13, wherein the means for accepting a monitoring request comprises means for accepting a monitoring request from the data process.

17. The apparatus of claim 13, further comprising:
means for accepting an updated monitoring request from the data process and for recurrently processing the monitoring request table to determine if the action characterized by the action code should be taken.

18. The apparatus of claim 13, wherein the means for taking an action characterized by the action code comprises:
means for reading an action definition from an action alert data structure; and
means for taking the action specified by the action definition.

19. A program storage device, readable by computer having a processor and a memory, tangibly embodying one or more programs of instructions executable by the computer to perform the method steps of monitoring a data process, the method steps comprising the steps of:
(a) accepting a monitoring request associated with the data process in a monitor request data structure, the monitoring request having an action time and an action code;
(b) recurrently processing the monitoring request data structure to determine if the action time is earlier than the current time;
(c) taking an action characterized by the action code when the action time is earlier than the current time and the data process has not completed; and
(d) deleting the monitoring request from the monitor request data structure after the action has been taken; and
wherein the method step of accepting a monitoring request in a monitor request data structure comprises the method step of inserting the monitoring request as a row in a monitor request table.

20. The program storage device of claim 19, wherein the data process job comprises a relational database management system query, and the monitor request table is stored in the relational database management system.

21. The program storage device of claim 19, wherein the method steps further comprise the step of repeating steps (a) through (f) until the data process has completed.

22. A program storage device, readable by computer having a processor and a memory, tangibly embodying one or more programs of instructions executable by the computer to perform the method steps of monitoring a data process, the method steps comprising the steps of:
(a) accepting a monitoring request associated with the data process in a monitor request data structure, the monitoring request having an action time and an action code;
(b) recurrently processing the monitoring request data structure to determine if the action time is earlier than the current time;
(c) taking an action characterized by the action code when the action time is earlier than the current time and the data process has not completed; and
(d) deleting the monitoring request from the monitor request data structure after the action has been taken; and
wherein the monitoring request is accepted from the data process.

23. A program storage device, readable by computer having a processor and a memory, tangibly embodying one or more programs of instructions executable by the computer to perform the method steps of monitoring a data process, the method steps comprising the steps of:
(a) accepting a monitoring request associated with the data process in a monitor request data structure, the monitoring request having an action time and an action code;
(b) recurrently processing the monitoring request data structure to determine if the action time is earlier than the current time;
(c) taking an action characterized by the action code when the action time is earlier than the current time and the data process has not completed;
(d) deleting the monitoring request from the monitor request data structure after the action has been taken;
(e) updating the monitoring request; and
(f) repeatedly performing steps (b) through (d) using an the updated monitoring request.

24. A program storage device, readable by computer having a processor and a memory, tangibly embodying one or more programs of instructions executable by the computer to perform the method steps of monitoring a data process, the method steps comprising the steps of:
(a) accepting a monitoring request associated with the data process in a monitor request data structure, the monitoring request having an action time and an action code;
(b) recurrently processing the monitoring request data structure to determine if the action time is earlier than the current time;
(c) taking an action characterized by the action code when the action time is earlier than the current time and the data process has not completed; and
(d) deleting the monitoring request from the monitor request data structure after the action has been taken; and
wherein the method step of taking an action characterized by the action code comprises the method steps of:
reading an action definition from an action alert data structure; and
taking the action specified by the action definition.

25. A program storage device, readable by computer having a processor and a memory, tangibly embodying one or more programs of instructions executable by the computer to perform the method steps of monitoring a data process, the method steps comprising the steps of:
(a) accepting a monitoring request associated with the data process in a monitor request data structure, the monitoring request having an action time and an action code;
(b) recurrently processing the monitoring request data structure to determine if the action time is earlier than the current time;
(c) taking an action characterized by the action code when the action time is earlier than the current time and the data process has not completed; and
(d) deleting the monitoring request from the monitor request data structure after the action has been taken; and
wherein the method step of taking the action characterized by the action code comprises the method step of transmitting a message to an interested party.

* * * * *